United States Patent

Carlson

(10) Patent No.: US 8,206,545 B2
(45) Date of Patent: Jun. 26, 2012

(54) MAGNETICALLY CURABLE COMPOSITION AND MAGNETIC CURE PROCESS

(75) Inventor: J. David Carlson, Cary, NC (US)

(73) Assignee: Lord Corporation, Cary, NC (US)

( * ) Notice: Subject to any disclaimer, the term of this patent is extended or adjusted under 35 U.S.C. 154(b) by 406 days.

(21) Appl. No.: 12/618,009

(22) Filed: Nov. 13, 2009

(65) Prior Publication Data

US 2010/0116641 A1  May 13, 2010

Related U.S. Application Data

(60) Provisional application No. 61/114,081, filed on Nov. 13, 2008.

(51) Int. Cl.
*B32B 38/04* (2006.01)

(52) U.S. Cl. ............... 156/275.5; 156/272.2; 156/272.4; 252/62.54; 252/62.56; 523/216; 524/435; 524/442

(58) Field of Classification Search ............... 156/272.2, 156/272.4, 275.5; 252/62.54, 62.56; 523/216; 524/435, 442
See application file for complete search history.

(56) References Cited

U.S. PATENT DOCUMENTS

| 4,200,480 | A | * | 4/1980 | Wolinski et al. ............ 156/294 |
| 4,357,259 | A | * | 11/1982 | Senyei et al. ............... 264/4.3 |
| 6,855,760 | B1 | | 2/2005 | Kirsten et al. |
| 7,569,624 | B2 | | 8/2009 | Kolbe et al. |
| 2004/0014860 | A1 | | 1/2004 | Meier et al. |

OTHER PUBLICATIONS

Peng et al., "Magnetically Responsive Elastic Microspheres," Applied Physics Letters, 92, 012108 (2008).

* cited by examiner

*Primary Examiner* — David W Wu
*Assistant Examiner* — Robert Jones, Jr.
(74) *Attorney, Agent, or Firm* — Todd W. Galinski

(57) ABSTRACT

A curable composition comprising magnetically active elastic microspheres that are filled with a curing agent. The elastomeric microspheres are predispersed throughout the curable resin and are magnetostrictive. Cure of the adhesive is initiated when an external magnetic field is applied that physically distorts or ruptures the magnetic microspheres due to a magnetostrictive effect from the magnetic field.

21 Claims, No Drawings

MAGNETICALLY CURABLE COMPOSITION AND MAGNETIC CURE PROCESS

CROSS-REFERENCE TO RELATED APPLICATIONS

The present application claims priority under 35 U.S.C. §119(e) from U.S. Provisional Patent Application Ser. No. 61/114,081, filed Nov. 13, 2008, entitled "MAGNETICALLY CURABLE COMPOSITIONS AND MAGNETIC CURE PROCESS", the disclosure of which is incorporated herein by reference.

FIELD OF THE INVENTION

The present invention relates to reactive compositions containing microencapsulated reaction components and a curing process whereby the cure is initiated through the application of a magnetic field.

BACKGROUND OF THE INVENTION

Curable compositions containing an encapsulated reaction component have been suggested in the art. U.S. Pat. No. 4,200,480 relates to an adhesive composition comprising a solution of non-reactive elastomer as for example, butadiene-acrylonitrile rubber dissolved in a mixture of polymerizable acrylic monomers and acrylic acid monomer such as methyl methacrylate and acrylic acid, containing a polymerization catalyst such as benzoyl peroxide, and applying to the other mating surface a tertiary amine activator encapsulated in a rupturable microsphere and dispersed in the adhesive composition. The microspheres may be ruptured before or after the adhesive is applied through a physical crushing or shearing force.

Additionally, U.S. Patent Application Publication No. 2004/0014860 describes a reaction adhesive comprising a reactive resin, and encapsulated curing agent for the resin and crystalline monoparticles with ferromagnetic, ferrimagnetic, superparamagnetic, piezoelectric or ferroelectric properties. The reaction adhesive is applied to the substrates and the substrates joined. The adhesive is subjected to an alternating electrical, magnetic or electromagnetic field to release the curing agent by heating the nanoparticles and causing the microcapsule shell to melt, swell or rupture.

This method, however, relies on a thermal interaction to cause the release of cure agent. There are applications which are temperature sensitive in which the adhesive must be maintained at or below a specific temperature, or where heat generated within the adhesive could damage components of the adhesive or the substrates being bonded.

It would therefore be desirable to provide an adhesive containing an encapsulated cure agent which can be activated at a desired time without physically shearing the material or internally heating the material.

SUMMARY OF THE INVENTION

In a first aspect of the present invention, a curable composition is provided comprising a curing component which is activated by a magnetic field. In another aspect of the present invention, a process for curing a curable composition is provided wherein the curing of the composition is initiated through the application of a magnetic filed. In a preferred embodiment of the present invention, the curable composition comprises an adhesive.

In one embodiment of the present invention, a magnetically curable composition is provided comprising a resin and a curing agent, wherein said curing agent is encapsulated in magnetically active microspheres comprising magnetically responsive particles, wherein said magnetically active microspheres are elastic and capable of magnetostrictive distortion sufficient to rupture the microsphere and release the curing agent when exposed to a magnetic field.

In one embodiment of the present invention, the magnetically active microspheres are rupturable through the application of a magnetic field without increasing the temperature of the microspheres or the surrounding composition more than 25° C., alternately without increasing the temperature more than 10° C., and most preferably without increasing the temperature of the microspheres.

In another embodiment of the present invention, the microspheres have an elongation to an aspect ratio of at least 1.5 in a magnetic field of 500 gauss, preferably at least 2.0 in a magnetic field of 300 gauss, and most preferably at least 2.5 in a magnetic field of 300 gauss.

In an additional embodiment of the present invention, the microsphere is capable of being ruptured through the application of a static magnetic field. In another embodiment of the present invention, the microsphere is capable of being ruptured through the application of a pulsed magnetic field, preferably where the duration of the pulse or pulses is less than 1 second. In a further embodiment of the present invention, the microspheres resonate with an applied magnetic frequency of 1 to 1000 Hz.

In another embodiment of the present invention, the microspheres have an average particle size of 10 to 200 microns, and preferably comprise a particle having an interior and an outer shell. In one embodiment of the present invention, the outer shell comprises polydimethylsiloxane.

In a still further embodiment of the present invention, the magnetically responsive particles are contained in the outer shell, and/or within the interior of the microsphere. In a preferred embodiment of the present invention, the magnetically responsive particles comprise $Fe_3O_4$.

In another aspect of the present invention, a method for curing a curable composition is provided wherein the curable composition is provided and a magnetic field is induced in proximity to the composition sufficient to rupture the microspheres and release the curing agent into the resin. In a preferred embodiment of the present invention, the magnetic field creates a sufficiently large magnetostrictive distortion to release the cure agent into the curable composition. In yet another embodiment of the present invention, the magnetic field comprises an AC magnetic field.

DETAILED DESCRIPTION OF THE INVENTION

In one embodiment of the present invention, a curable composition is provided comprising magnetically active elastic microspheres that are filled with a curing agent. These elastomeric microspheres are predispersed throughout the curable resin and are magnetostrictive. Cure of the adhesive is initiated when an external magnetic field is applied that physically distorts or ruptures the magnetic microspheres due to a magnetostrictive effect from the magnetic field.

The methods and compositions of the present invention may be carried out with any reactive curable, polymerizable, or crosslinkable composition where one of the reactive components or catalyst is capable of being encapsulated in an elastomeric microsphere. Generally, the cure agent/catalyst/initiator will be the encapsulated portion with the primary polymer resin comprising the bulk of the curable composition. Examples of such polymeric resin materials include epoxies, polyurethanes, acrylates, polyesters, phenolic resins, silicones and silanes, and mixtures thereof.

In one embodiment of the present invention, the microsphere is constructed in a core/shell configuration wherein the core is fillable and the shell comprises an elastic material. In order to be distorted by a magnetic field, the microsphere must have sufficient elasticity such that the wall of the sphere can stretch or otherwise deform. This deformation in an applied magnetic field is commonly referred to as a magnetostrictive effect. As the deformation increases, the shell eventually splits, fractures, or breaks releasing the curing agent encased therein.

In a preferred embodiment of the present invention, the shell is made from an elastic material such as polydimethylsiloxane (PDMS). The PDMS shell allows the magnetically responsive particles to respond to an applied magnetic field by distorting the shape of the microsphere such that the shell is stretched in the direction of the applied magnetic field. Additionally, PDMS has relatively low toughness to allow the microsphere to rupture when enough magnetostrictive force is applied.

In one embodiment of the present invention, the core/shell microspheres are produced using micro-fluidic techniques such as those described in Suili Peng, et al. "Magnetically Responsive Elastic Microspheres", Applied Physics Letters, Volume 92, 012108 (2008), herein incorporated by reference.

In a preferred embodiment of the present invention, providing microspheres which are relatively uniform in size will allow for predictable release of the encapsulated material. The size of the particles affects the frequency at which they resonate. If all or most of the particles fall within a narrow size distribution, they will all resonate at roughly the same frequency. This allows the magnetostrictive effect and subsequent release of cure agent to be "tuned" to a specific frequency of applied magnetic field. In a more preferred embodiment of the present invention, particle diameters vary by less than 5%, and in a most preferred embodiment of the present invention the particle diameters vary by less than 1%.

The magnetically active microspheres can be constructed in a variety of sizes, limited primarily by the size of the magnetically responsive particles employed therein and nature of the final curative formulation desired. In one embodiment of the present invention, the magnetically active microsphere is between 10 and 200 microns in diameter. In another embodiment of the present invention, the magnetically active microsphere is between 30 and 150 microns in diameter.

In one embodiment of the present invention, the magnetically responsive particle can be iron alone or iron optionally in combination with alloying levels of aluminum, silicon, cobalt, nickel, vanadium, molybdenum, chromium, tungsten, boron, manganese and/or copper and the like. Exemplary particles also comprise micron or nano-sized nickel, iron oxide, and/or iron nitride, and/or iron carbide. Preferred materials for the magnetically responsive particle comprise pure iron oxides, such as $Fe_2O_3$ and $Fe_3O_4$, as well as those containing small amounts of other elements, such as manganese, zinc or barium.

In a preferred embodiment of the present invention, the magnetically responsive particles are less than about 10 microns in diameter, most preferably less than 1 micron in diameter.

As discussed above, one aspect of this invention is the amount of distortion that can be created in the magnetically active microspheres. Because of the combination of ferromagnetic or ferrimagnetic particles in a rubber-like elastomeric shell very large deformations or distortions can be created which ultimately destroy the integrity of the shell and allow the contained catalyst/activator material to be released.

Preferred microspheres are those that distort to have aspect ratios of greater than 2.0 at modest magnetic field strengths. For the purposes of this invention, aspect ratio is defined as the ratio of major axis length to the perpendicular or transverse dimension of the particle. In other words the originally spherical particles become distorted into prolate spheroid, i.e. footballs. Further increasing the intensity of the magnetic field causes even more distortion.

In one embodiment of the present invention, the particles exhibit an aspect ratio of at least 1.5 at 300 gauss applied field. In another embodiment of the present invention, the particles exhibit an aspect ratio of at least 2.0 at 300 gauss. In still another embodiment of the present invention, the particles exhibit an aspect ratio of at least 2.5 at 300 gauss.

In a preferred embodiment of the present invention, the magnetically responsive particles are contained within the shell of the elastic microsphere. It is preferred that the particles be dispersed as uniformly as possible within the shell of the microsphere, however, the orientation of the particles does not appear to be influential on the magnetostrictive effect. In an alternate embodiment of the present invention, the magnetically responsive particles are contained within the interior of the microsphere along with the curing agent and any other optional components.

The cure agent filled elastic microspheres are mixed with a reactive resin and the resin remains uncured so long as the cure agent is contained within the microspheres. When a magnetic field is applied, the microsphere distorts and ruptures to release the curing agent into the surrounding resin, thereby initiating the resin cure reaction.

In one embodiment of the present invention, initiation of the curing reaction in the curable composition is effected by applying a magnetic field to the composition to create a sufficiently large magnetostrictive distortion in the microsphere such that the shell of the microsphere is perforated or ruptured and the curing agent is released into the surrounding resin.

In a preferred embodiment of the present invention, the magnetic field is constructed so as to prevent heating of the magnetically responsive particles or microsphere. In one embodiment of the present invention, the applied magnetic field comprises a static, direct current (DC), field. In a most preferred embodiment of the present invention, the DC field comprises 500 to 20,000 gauss (0.05 to 2 Tesla). In another embodiment of the present invention, the DC field comprises a short duration magnetic pulse or pulses having a peak magnetic field in the range of 500 to 20,000 gauss (0.05 to 2 Tesla) and a pulse duration less than 1 second.

In a further embodiment of the present invention, the applied magnetic field is not constant but sinusoidal or alternating in polarity (AC). In this case the frequency of the applied magnetic field is adjusted to cause a vibratory resonance in the magnetic microspheres that builds in amplitude until the particles are ruptured.

In a still further embodiment of the present invention, it is not necessary to completely rupture the microspheres in order to release the catalyst/curative into the surrounding adhesive resin. Repeated distortion of the microspheres with an AC magnetic field can be sufficient to cause catalyst/curative to be released through small pores in the shell of the microsphere. Each time the particle distorts due to magnetostriction a small amount of catalyst/curative is squeezed out.

In a preferred embodiment of the present invention, a low frequency AC magnetic field in the range of 1 to 1000 Hz is applied. Preferably, the magnitude of the AC magnetic field has an RMS value between 500 and 20,000 gauss (0.05 and 2 Tesla).

In various embodiments of the present invention, means for inducing the magnetic field include, but are not limited to, a permanent magnet drawn over the portion of the composition to be cured, a DC or AC electromagnet, an alternating magnetic field applied by means of a spinning permanent magnet assembly, and the like.

In one preferred embodiment of the present invention, the curable composition is employed as an adhesive to bond two substrates together. The curable adhesive containing magnetically active microspheres is disposed between the two substrates to be bonded, and a magnetic field is applied to rupture the microspheres and cure the adhesive. In this manner, cure of the adhesive can be initiated at any desired time without the need to heat the substrates or the adhesive as is common in the art.

In an alternative embodiment the magnetic field is applied as the curable composition exits a suitable dispenser such as at the nozzle of a syringe or caulking gun.

In an alternate embodiment of the present invention, the curable composition is employed as a coating and has particular utility when a curable coating is desired, but common cure systems comprising heat, light or other non-magnetic cure initiators means are not appropriate.

In a still further embodiment of the present invention, the effects of particle size of the magnetically active microsphere on resonant frequency can be exploited in additional beneficial ways. For example, at least two distinct populations of particles having differing average particle size, and therefore differing resonant frequencies, are employed to provide controlled, timed, release of two encapsulated materials into the surrounding resin.

In one exemplary embodiment of the present invention, a first set of microspheres contain a curing agent while a second set of microspheres having a different resonant frequency contains a de-curing or polymer unzipping agent. In this manner, the curable composition would be applied and then cured by application of a magnetic field at frequency $\omega_1$ to rupture the first set of microspheres and release the cure agent. At a later point in time, when it is desired to disassemble the bonded parts, a different frequency magnetic field is applied $\omega_2$ to rupture the second set of microspheres and release the polymer unzipping or de-bonding agent. This causes the adhesive to come apart and releases the previously bonded components.

In an alternate embodiment of the present invention, a first population of microspheres could be used to create a quick "b-stage" or partial cure that holds components in place. Then a second population of microspheres containing a stronger cure agent could be activated to achieve a final cure.

Although the present invention has been described with reference to particular embodiments, it should be recognized that these embodiments are merely illustrative of the principles of the present invention. Those of ordinary skill in the art will appreciate that the compositions, apparatus and methods of the present invention may be constructed and implemented in other ways and embodiments. Accordingly, the description herein should not be read as limiting the present invention, as other embodiments also fall within the scope of the present invention as defined by the appended claims.

What is claimed is:

1. A magnetically curable composition comprising a resin and a curing agent, wherein said curing agent is encapsulated in magnetically active microspheres comprising magnetically responsive particles, wherein said magnetically active microspheres are elastic and capable of magnetostrictive distortion sufficient to rupture the microsphere and release the curing agent when exposed to a magnetic field.

2. The composition of claim 1, wherein said magnetically active microspheres are rupturable through the application of a magnetic field without increasing the temperature of the microspheres or the surrounding composition more than 25° C.

3. The composition of claim 1, wherein said magnetically active microspheres are rupturable through the application of a magnetic field without increasing the temperature of the microspheres or the surrounding composition more than 10° C.

4. The composition of claim 1, wherein said magnetically active microspheres are rupturable through the application of a magnetic field without increasing the temperature of the microspheres.

5. The composition of claim 1, wherein said microspheres have an elongation to an aspect ratio of at least 1.5 in a magnetic field of 500 gauss.

6. The composition of claim 1, wherein said microspheres have an elongation to an aspect ratio of at least 2.0 in a magnetic field of 300 gauss.

7. The composition of claim 1, wherein said microspheres have an elongation to an aspect ratio of at least 2.5 in a magnetic field of 300 gauss.

8. The composition of claim 1, wherein said microspheres are capable of being ruptured through the application of a static magnetic field.

9. The composition of claim 1, wherein said microspheres are capable of being ruptured through the application of a pulsed magnetic field.

10. The composition of claim 1, wherein said microspheres are capable of being ruptured through the application of a pulsed magnetic field where the duration of the pulse or pulses is less than 1 second.

11. The composition of claim 1, wherein said microspheres resonate with an applied magnetic frequency of 1 to 1000 Hz.

12. The composition of claim 1, wherein said microspheres have an average particle size of 10 to 200 microns.

13. The composition of claim 1, wherein the magnetically active microspheres comprise particles having an interior and an outer shell.

14. The composition of claim 10, wherein the outer shell comprises polydimethylsiloxane.

15. The composition of claim 10, wherein the magnetically responsive particles are contained in the outer shell.

16. The composition of claim 10, wherein the magnetically responsive particles are contained within the interior of the microspheres.

17. The composition of claim 1, wherein the magnetically responsive particles comprise $Fe_3O_4$.

18. The composition of claim 1, wherein the composition is employed as an adhesive to bond at least two substrates.

19. A method for curing a curable composition comprising:
providing the composition of claim 1, and
inducing a magnetic field in proximity to the composition sufficient to rupture the microspheres and release the curing agent into the resin.

20. The method of claim 19, wherein the magnetic field creates a sufficiently large magnetostrictive distortion to release the cure agent into the curable composition.

21. The method of claim 19, wherein the magnetic field comprises an AC magnetic field.

* * * * *